Figure 1:
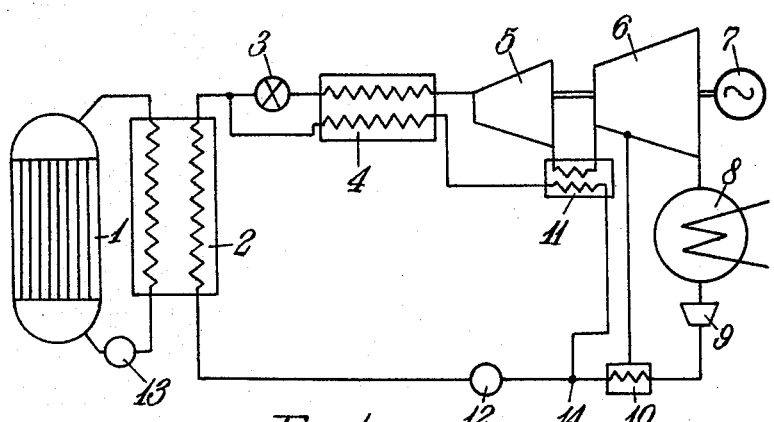

April 24, 1962    W. HRYNISZAK ETAL    3,030,779
THERMAL POWER PLANTS
Filed Nov. 20, 1957

United States Patent Office 3,030,779
Patented Apr. 24, 1962

3,030,779
THERMAL POWER PLANTS
Waldemar Hryniszak and Donald A. Jones, Newcastle-upon-Tyne, England, assignors to C. A. Parsons & Company Limited, Newcastle-upon-Tyne, England
Filed Nov. 20, 1957, Ser. No. 697,549
Claims priority, application Great Britain Dec. 7, 1956
1 Claim. (Cl. 60—104)

This invention relates to thermal power plants and especially to those thermal power plants in which the supply of heat is at relatively low temperature as for example in nuclear power plants where due to temperature limitations imposed by the nuclear fuel the maximum temperatures which can be achieved are of the order of 700–800° F.

If the working fluid of the power plant is steam then difficulties arise due to the increased wetness of the steam over the normal expansion range compared with plants where the steam can be superheated to the desired amount.

In addition due to the change of state of the working fluid in changing from water to steam the maximum use is not made of the heat available from the heat source and in general large and complicated heat exchangers are needed for steam raising.

The object of the present invention is to provide a thermal power plant with improved utilisation of the heat available and in particular to provide a plant suitable for use under temperature conditions as stated above wherein the above disadvantages are substantially overcome.

The invention consists in a thermal power plant in which a fluid at a pressure above its critical pressure is heated and then divided into streams of which one is throttled before being used as the working fluid in mechanical power producing means, another or the other stream of which by-passes the throttle and the mechanical power producing means and is used to heat the throttled fluid.

The invention also consists in a thermal power plant in which a fluid at a pressure above its critical pressure is heated and then divided into streams, one stream being throttled before being used as the working fluid in mechanical power producing means and another stream by-passing the throttle and the mechanical producing means and being used to heat the throttled fluid.

The invention also consists in a thermal power plant in accordance with either of the preceding two paragraphs in which the stream of throttled fluid is liquified after use as the working fluid in the mechanical power producing means and is then raised above the critical pressure before rejoining the stream by-passing the throttle.

The invention also consists in thermal power plant in accordance with any of the preceding three paragraphs, in which when two or more mechanical power producers are used for expanding the working fluid the stream of fluid which heats the throttled stream is also used to reheat said throttled fluid between the mechanical power producers.

The invention also consists in a thermal power plant in accordance with any of the preceding four paragraphs in which the fluid is water.

The invention also consists in a nuclear power plant comprising a nuclear reactor, the heat generated in which is removed by a cooling fluid, a first heat exchanger in which said cooling fluid gives up its heat to water at a pressure above its critical pressure, means for dividing the water leaving the said first heat exchanger into two flow paths a first flow path and a second flow path, the first flow path containing a throttle through which the water is converted to steam before passing through a second heat exchanger where the steam is superheated before being expanded in a turbine or turbines, condenser means for condensing the steam leaving the turbine or turbines and pump means for removing the condensate from the condenser, said second flow path passing through the said second heat exchanger to heat the steam produced by throttling, the two flow paths being joined together between the turbine outlet and the inlet to the said first heat exchanger and returned to the said first heat exchanger by circulatory means.

The invention also consists in a thermal power plant substantially as described below with reference to the diagrammatic drawings FIGURES 1 and 2 accompanying this specification.

In carrying the invention into effect in the form illustrated by way of example in FIGURE 1, a nuclear power plant comprises a reactor 1, a heat exchanger 2, a throttle 3, a second heat exchanger 4, turbines 5 and 6, electric generator 7, a condenser 8, pump 9, a feed heater 10 and a reheat heat exchanger 11, and circulators 12 and 13.

Heat released in the reactor is removed by means of a cooling gas flowing in a closed circuit in which is located the exchanger 2. In the heat exchanger 2 the heat is given up to water which is at a pressure above its critical pressure. The water on leaving heat exchanger 2 is divided into two streams. One stream flows through throttle 3 where it is expanded and is converted to steam. The other stream enters heat exchanger 4 and heats the steam produced by throttle 3 thus superheating it. The superheated steam is then expanded in turbines 5 and 6 which drive the electric generator 7.

After expansion in the turbines the steam is condensed in the condenser 8 from which the condensate is removed by the pump which raises the pressure of the water above the critical value before it rejoins the remainder of the water in the other stream at 14. Between the pump and point 14 it may pass through a feed heater 10. The stream of water by-passing the throttle may be further cooled after leaving heat exchanger 4 by using it to reheat in heat exchanger 11 the steam passing between turbines 5 and 6. A circulator 12 returns the liquid to the heat exchanger 2. Circulator 13 circulates the cooling fluid through the reactor.

Whilst in the form illustrated the necessary pressure drop is achieved with one throttle, the pressure drop may be achieved by arranging several throttles in series or some of the pressure drop can be achieved by the use of throttles and the remainder in part of the heat exchanger itself by having tubes of smaller diameter than would otherwise be used.

Figure 2:
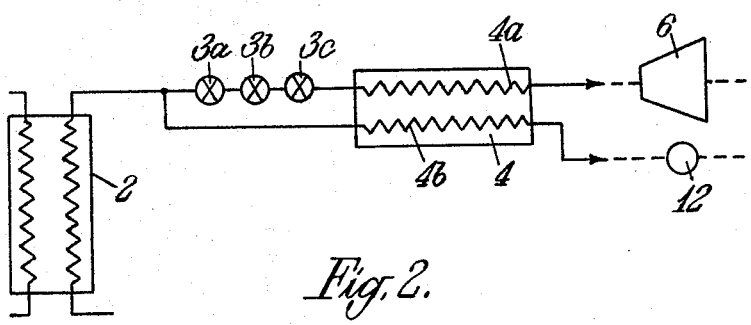

A form with multiple throttling stages is shown in FIGURE 2 accompanying this specification where three throttles 3a, 3b and 3c are arranged in series on the way from the heat exchanger 2 to the heat exchanger 4 in which the top set of tubes indicated by 4a may be of reduced diameter to assist in obtaining the desired pressure drop on the way to turbine 6 the lower tubes 4b passing to circulator 12.

More feed heaters than illustrated may be employed if desired and reheat may take place between each turbine if more than two are employed.

The invention has the advantage that full utilisation of the heat available is obtained due to the fact that no change of state in the fluids in heat exchange relationship takes place.

The fluid which is used in the power producing part of the plant is circulated in a liquid form and therefore the circulating power required is reduced and as in each heat exchanger heat exchange takes place between a gas and a liquid the heat transfer is improved over heat exchangers where the heat exchange takes place between a gas and a fluid which is initially a liquid and then changes its state to a gas.

The heat exchangers, because of the abovementioned heat transfer improvement can be reduced in size and simplified in construction needing only one section.

No limit is imposed on the pressure levels used in the cycle as is the case of those cycles where, to superheat the steam at the temperatures obtainable, the pressures must be kept low. Consequently, the volumes of fluid to be handled in the heat exchangers and ducts in the plant are much reduced.

Another advantage is that the cycle is flexible in that by varying the quantities of fluid being throttled and those by-passing the throttle, the power output can be increased at the expense of thermal efficiency or vice versa to suit any given set of circumstances.

For a given output the cycle gives an increase in thermal efficiency over normal plants because of the reduction of irreversible thermodynamic processes due to the avoidance of change of state in the heat exchangers.

The invention allows for the expansion of steam in a turbine to a value within acceptable limits of wetness and yet avoids some of the disadvantages of plants proposed hitherto for use where the maximum temperatures were relatively low of the order of 700–800° F., namely large heat exchangers and ducts and inefficient utilisation of the heat produced by the heat source.

We claim:

A thermal power plant comprising a first heat exchanger in which water is heated at a pressure such that it does not boil, means for dividing the water leaving the said first heat exchanger into two flow paths, a first flow path and a second flow path, the first flow path containing a throttle through which the water is converted to steam before passing through a second heat exchanger where the steam is superheated before being expanded in a turbine or turbines, condenser means for condensing the steam leaving the turbine or turbines and pump means for removing the condensate from the condenser, said second flow path by-passing the throttle and passing through the said second heat exchanger to heat the steam produced by throttling, the two flow paths being joined together between the turbine outlet and the inlet to the said first heat exchanger and returned to the said first heat exchanger by circulatory means.

References Cited in the file of this patent

UNITED STATES PATENTS

| | | |
|---|---|---|
| 1,767,714 | Stender | June 29, 1930 |
| 1,954,823 | Lucke | Apr. 17, 1934 |
| 2,865,827 | Dwyer | Dec. 23, 1958 |

OTHER REFERENCES

AECD 3712, History and Status of EBR, April 15, 1953. Declassified Nov. 14, 1955, pages 20, 53, 54, 55 and 56.